US010131740B2

(12) United States Patent
Arzt et al.

(10) Patent No.: US 10,131,740 B2
(45) Date of Patent: Nov. 20, 2018

(54) AQUEOUSLY DISPERSIBLE POLYURETHANE

(71) Applicant: Allnex Austria GmbH, Werndorf (AT)

(72) Inventors: Anton Arzt, Neu-Tillmitsch (AT); Robert Harrer, Graz (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 0 days.

(21) Appl. No.: 14/410,740

(22) PCT Filed: Jul. 16, 2013

(86) PCT No.: PCT/EP2013/065030
§ 371 (c)(1),
(2) Date: Dec. 23, 2014

(87) PCT Pub. No.: WO2014/016171
PCT Pub. Date: Jan. 30, 2014

(65) Prior Publication Data
US 2015/0183921 A1    Jul. 2, 2015

(30) Foreign Application Priority Data
Jul. 24, 2012  (EP) .................................. 12177619

(51) Int. Cl.
| C08G 18/10 | (2006.01) |
| C08G 18/66 | (2006.01) |
| C08G 18/28 | (2006.01) |
| C08G 18/38 | (2006.01) |
| C08G 18/61 | (2006.01) |
| C08G 18/65 | (2006.01) |
| C08G 18/08 | (2006.01) |
| C08G 18/12 | (2006.01) |
| C08G 18/76 | (2006.01) |
| C09D 175/06 | (2006.01) |

(52) U.S. Cl.
CPC ......... *C08G 18/6644* (2013.01); *C08G 18/08* (2013.01); *C08G 18/0819* (2013.01); *C08G 18/0823* (2013.01); *C08G 18/0828* (2013.01); *C08G 18/12* (2013.01); *C08G 18/289* (2013.01); *C08G 18/2835* (2013.01); *C08G 18/3893* (2013.01); *C08G 18/61* (2013.01); *C08G 18/6541* (2013.01); *C08G 18/664* (2013.01); *C08G 18/765* (2013.01); *C09D 175/06* (2013.01)

(58) Field of Classification Search
CPC ............. C08G 18/6644; C08G 18/765; C08G 18/664; C08G 18/08; C08G 18/3893; C08G 18/289; C08G 18/2835; C08G 18/0823; C09D 175/06
See application file for complete search history.

(56) References Cited

U.S. PATENT DOCUMENTS

| 3,412,054 A | 11/1968 | Milligan et al. |
| 3,640,924 A | 2/1972 | Trimble et al. |
| 3,723,372 A | 3/1973 | Wakimoto et al. |
| 3,920,598 A | 11/1975 | Reiff et al. |
| 4,046,729 A | 9/1977 | Scriven et al. |
| 4,314,918 A | 2/1982 | Birkmeyer et al. |
| 4,543,376 A | 9/1985 | Schupp et al. |
| 4,567,228 A * | 1/1986 | Gaa ..................... C08G 18/0804 524/588 |
| 4,885,392 A | 12/1989 | Lenz et al. |
| 5,334,651 A | 8/1994 | Schwab et al. |
| 5,510,444 A * | 4/1996 | Halpaap .............. C08G 18/3831 428/422.8 |
| 5,760,123 A * | 6/1998 | Vogt-Birnbrich ........................... C08G 18/0804 524/500 |
| 6,613,859 B2 * | 9/2003 | Shores ............... C08G 18/0804 428/447 |
| 6,884,853 B1 | 4/2005 | Asaoka et al. |
| 6,992,132 B2 | 1/2006 | Trombetta et al. |
| 2009/0264577 A1* | 10/2009 | Blum ................. C08G 18/0823 524/501 |
| 2010/0092783 A1 | 4/2010 | Takahara et al. |
| 2012/0269974 A1 | 10/2012 | Arzt et al. |

FOREIGN PATENT DOCUMENTS

| DE | 2020905 | 2/1971 |
| DE | 2314513 | 10/1974 |
| DE | 26 24 442 | 12/1976 |
| DE | 27 44 544 | 4/1978 |
| DE | 2811913 | 2/1980 |
| DE | 3124784 | 4/1982 |
| DE | 3644371 | 7/1988 |
| EP | 0 120 466 | 10/1984 |
| EP | 2 067 803 | 6/2009 |
| EP | 2 316 868 | 5/2011 |
| GB | 1 575 637 | 9/1980 |
| JP | 2005/226060 | * 8/2005 ............. C08L 75/04 |
| WO | 95/21206 | 8/1995 |

OTHER PUBLICATIONS

English Translation of JP-2005/226060.*
International Search Report dated Aug. 21, 2013 in International (PCT) Application No. PCT/EP2013/065030.

* cited by examiner

Primary Examiner — Michael L Leonard
(74) Attorney, Agent, or Firm — Wenderoth, Lind & Ponack, L.L.P.

(57) ABSTRACT

The invention relates to an aqueously dispersible polyurethane having a specific amount of silicon $n(Si)/m(PU)$ of from 0.05 mol/kg to 1 mol/kg, and a specific amount of urea groups, $n(U)/m(PU)$, >N—CO—N< of from 0.8 mol/kg to 2 mol/kg, wherein in each case the specific amount of substance is calculated as the ratio of the amount of substance $n$ of the entity under consideration, to the mass $m(PU)$ of the polyurethane, to a process for the preparation thereof, and a method of use thereof.

14 Claims, No Drawings

AQUEOUSLY DISPERSIBLE POLYURETHANE

FIELD OF THE INVENTION

The invention relates to an aqueously dispersible polyurethane. It further relates to a process of preparation thereof, and a method of use of the dispersion thus prepared.

BACKGROUND OF THE INVENTION

Aqueous dispersions of polyurethanes have been known, i. a., from U.S. Pat. No. 5,334,651. These polyurethanes are based on reaction products of polyfunctional isocyanates, polyols having a number average molar mass of at least 400 g/mol, and compounds having at least two groups which are reactive towards isocyanate groups, and at least one group capable of anion formation, which are reacted to form an isocyanate-functional prepolymer, and which prepolymer is reacted in a second step with at least one of low molar mass polyols, and compounds which have one active hydrogen atom, or more than one active hydrogen atom wherein these said hydrogen atom differ in reactivity towards isocyanate groups. These polyurethanes are hydroxy-functional at least due to the reaction of the second step, and aqueous dispersions thereof can be cured with isocyanate crosslinking agents to give tough and resilient films.

Coating films prepared from these polyurethanes can still be improved particularly with respect to their solvent resistance and resistance to soiling and graffiti.

It has been found in the investigations leading to this invention that a particular choice of starting materials, or educts, together with a certain combination of the specific amount of substance of hydroxyl groups, of the specific amount of substance of urea groups, and of the degree of branching in the molecules constituting the hydroxy functional polyurethanes provides the desired combination of hardness, as measured by the König method, anti-graffiti properties, and solvent resistance, of coating films prepared from the said polyurethanes in a two-pack composition, including adapted crosslinkers therefor.

The invention therefore relates to an aqueously dispersible polyurethane having
(aa) a specific amount of substance of silicon n(Si)/m(PU) of from 0.05 mol/kg to 1 mol/kg, and
(cc) a specific amount of substance of urea groups, n(U)/m(PU),

 (formula I)

of from 0.8 mol/kg to 2 mol/kg,
wherein in each case the specific amount of substance is calculated as the ratio of the amount of substance n of the entity under consideration (atoms such as Si and C, groups of atoms such as
>N—CO—N< and —OH), to the mass m(PU) of the polyurethane.

In a preferred embodiment, the polyurethane may additionally also have one or both of the following properties:
(bb) a degree of branching measured as the sum of the specific amounts of substance of tertiary aliphatic carbon atoms $C^3$ and of quaternary aliphatic carbon atoms $C^4$, $(n(C^3)+n(C^4))/m(PU)$, of from 0.01 mol/kg to 0.5 mol/kg, and
(dd) a specific amount of substance of hydroxyl groups, n(—OH)/m(PU), of from 1 mol/kg to 4 mol/kg.

The invention is also directed to a process for the preparation of the aqueously dispersible polyurethane PU according to the invention, comprising the steps of
(a) preparing a mixture A of at least two hydroxy-functional polymers A, having a number average molar mass of at least 400 g/mol, and, on average, more than one hydroxyl group per molecule, where i is an integer number from 1 to at least two, which means that there are at least two hydroxy functional polymers A1 and A2 and wherein at least one of the hydroxy-functional polymers A, is a silicon-containing polyol A1,
(b) mixing the mixture A of hydroxy-functional polymers with either or both of (b1) a hydroxy-functional or amino-functional acid B1 which has at least one, and preferably two, functional groups selected from the group consisting of hydroxyl groups, primary amino groups, and secondary amino groups, and at least one acid group, and (b2) a polyether B2 which has oligo-oxyethylene groups obeying the formula II

 (II)

wherein n is from 1 to 100, and at least one, preferably two hydroxyl groups, or with either or both of (b3) a hydroxy-functional or amino-functional basic compound B3 which has at least one, and preferably two, hydroxyl or primary or secondary amino groups and at least one basic group which is preferably a tertiary amino group, and (b4) a polyether B2 which has oligo-oxyethylene groups obeying the formula II

 (II)

wherein n is from 1 to 100, and at least one, preferably two hydroxyl groups,
(c) reacting the mixture prepared in step (b) with at least one polyfunctional isocyanate C having at least two isocyanate groups per molecule, wherein the amount of isocyanate C is chosen such that there is a ratio of isocyanate groups in component C to hydroxyl groups present in the mixture prepared in step (b) of from 2:1 to 1.1:1, until at least 90% of the hydroxyl groups of the mixture prepared in step (b) are consumed by reaction with the isocyanate component C,
(d) adding to the reaction product of step (c) at least one of a hydroxyamine D having at least one primary or secondary amino group, and at least one hydroxyl group, a polyhydric alcohol E having at least two hydroxyl groups per molecule, and a polyfunctional amine F having at least two amino groups, each of the amino groups being selected from primary and secondary amino groups,
(e) dispersing the reaction product of step (d) in water, wherein the amounts of the reactants A, A1, B1, B2, B3, C, D, E, and F are chosen such that the resultant polyurethane PU fulfills the conditions (aa) and (cc), as detailed supra, and optionally, either or both of the conditions (bb) and (dd).

In the context of the present invention, the mixture A of hydroxy functional polymers having, on average, more than one hydroxyl group per molecule, and preferably, at least two hydroxyl groups per molecule, preferably comprises a mass fraction of at least 1%, and up to 60%, of a silicon-containing hydroxy functional polymer A1 of formula III

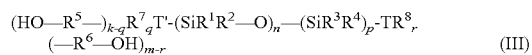 (III)

wherein
$R^1$ is an alkyl having from one to ten carbon atoms, and may be linear or branched, or an aryl having from six to twenty carbon atoms which may also be substituted by one or more alkyl or alkoxy groups having from one to ten carbon atoms, and which latter alkyl or alkoxy groups may be linear or branched, $R^2$ is selected from the same group as $R^1$, but independently thereof, $R^3$ is selected from the same group as $R^1$, but independently thereof, $R^4$ is selected from the same group as $R^1$, but independently thereof, $R^5$ is an alkylene group which may be linear or branched, having from one to ten carbon atoms, which may also be substituted by one or more alkyl or alkoxy groups having from one to ten carbon atoms, and which latter alkyl or alkoxy groups may be linear or branched, $R^6$ is selected from the same group as $R^5$, but independently thereof, $R^7$ is selected from the group consisting of a hydrogen atom, an alkyl group which may be linear or branched, having from one to twenty carbon atoms, and an aryl, alkaryl, and aralkyl group each having independently from each other from six to thirty carbon atoms, $R^8$ is selected from the group consisting of a hydrogen atom, an alkyl group which may be linear or branched, having from one to twenty carbon atoms, and an aryl, alkaryl, and aralkyl group each having independently from each other from six to thirty carbon atoms, T is a direct bond or an atom selected from the group consisting of O, N, or an aliphatic or aromatic group with m+1 binding sites which are not on the same carbon atom in the case of T being an aliphatic or aromatic group, and m may be from 1 to 4, and is 1 for O, and 2 for N, r being an integer of from 0 to m−1, and T not being O if p is 0, T' is a direct bond or an atom selected from the group consisting of O, N, or an aliphatic or aromatic group with k+1 binding sites which are not on the same carbon atom in the case of T' being an aliphatic or aromatic group, and k may be from 1 to 4, and is 1 for O, and 2 for N, q being an integer of from 0 to k n is from 2 to 100, and p is 0 or 1.

According to these conditions, the silicon-containing hydroxy-functional polymer A1 has at least one hydroxyl group in its molecule.

DETAILED DESCRIPTION OF THE PREFERRED EMBODIMENTS

In a preferred embodiment, the said aqueously dispersible polyurethane has a degree of branching measured as the sum of the specific amount of substance $n(C^3)/m(PU)$ of tertiary aliphatic carbon atoms and of the specific amount of substance $n(C^4)/m(PU)$ of quaternary aliphatic carbon atoms, which is at least 0.01 mol/kg, and not more than 0.5 mol/kg, more preferably, from 0.02 mol/kg to 0.48 mol/kg, particularly preferably, from 0.03 mol/kg to 0.45 mol/kg, and especially preferably, from 0.05 mol/kg to 0.40 mol/kg.

The tertiary and quaternary carbon atoms are preferably those that are directly bound with a single bond to three (tertiary carbon atom $C^3$) or four (quaternary carbon atom $C^4$) further carbon atoms which may be part of a linear, branched or cyclic organic structure, and may optionally be substituted, and which organic structures may optionally comprise ether groups —O—, imino groups —NH, or alkylimino groups —N(Alkyl)-, where the alkyl group of the alkylimino group has preferably from one to twenty carbon atoms, and may be linear, branched or cyclic, thioether groups —S—, or carbonyl groups —CO—, wherein the said organic structure further comprises an ester group —O—CO—, or a urethane group —O—CO—NH—. Particularly preferably, these tertiary and quaternary carbon atoms are derived from a trihydric or tetrahydric alcohol, such as trimethylol ethane, trimethylol propane, trimethylol butane, pentaerythritol, di-trimethylol ethane, di-trimethylol propane, and di-trimethylol butane, especially by urethane formation or ester formation of such trihydric or tetrahydric alcohol.

In a further preferred embodiment, the said aqueously dispersible polyurethane has a specific amount of substance of acid and/or acid anion groups of from 0.1 mol/kg to 1.8 mol/kg.

In a further preferred embodiment, the said aqueously dispersible polyurethane has a mass fraction of oligo-oxyethylene groups of from 1% to 25%, wherein oligo-oxyethylene groups obey the formula II:

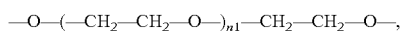

wherein $n1$ is from 1 to 100.

In a further preferred embodiment, the said aqueously dispersible polyurethane has both a mass fraction of oligo-oxyethylene groups of from 1% to 25%, wherein the oligo-oxyethylene groups obey the formula II:

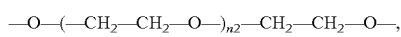

wherein n2 is from 1 to 100, and a specific amount of substance of acid and/or acid anion groups of from 0.1 mol/kg to 1.8 mol/kg.

In a further preferred embodiment, the said aqueously dispersible polyurethane has a specific amount of substance of basic groups and/or cationic groups of from 0.1 mol/kg to 1.8 mol/kg. It may also comprise both said basic and said oxyethylene groups.

The mixture A of hydroxy functional polymers having, on average, more than one hydroxyl group per molecule, comprises a mass fraction of at least 0.5%, preferably, at least 0.75%, and particularly preferred, at least 1.0%, and up to 10%, preferably, up to 7.5%, and particularly preferred, up to 5%, of the silicon-containing hydroxy functional polymer A1 of formula III

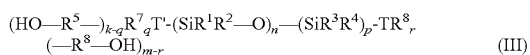 (III)

as explained supra.

This polymer is preferably linear, i. e. not branched in which case m−r=1, and k−q=1, and the number of hydroxyl groups in one molecule of A1 is then preferably 2.

It is further preferred to use a mixture A of hydroxy functional polymers that also comprises a mass fraction of from at least 1% up to at most 99% of a hydroxy-functional polycarbonate having on average at least two hydroxyl groups per molecule, particularly preferably a dihydroxy-polycarbonate.

In a preferred embodiment, the said process comprises using a hydroxy-functional acid B1 in step (b), and in step (e). It is further preferred that in this case, the reaction product of step (d) is neutralised before or during or after dispersing in water by adding an alkaline reagent selected from alkali hydroxides, earth alkali hydroxides, amines, ammonium hydroxide and alkylated ammonium hydroxides such as tetramethyl ammonium hydroxide or tetraethylammonium hydroxide.

In a further preferred embodiment, the said process comprises using a hydroxy-functional basic compound B3 in step (b), and in step (e). In that case, it is further preferred that the reaction product of step (d) is neutralised before or during or after dispersing in water by adding an acidic reagent selected from inorganic and organic acids.

In a further preferred embodiment, the said process comprises using a polyhydric organic compound A' having at least three hydroxyl groups per molecule, and a molar mass of not more than 500 g/mol which polyhydric compound is also to be added in step (b).

In a further preferred embodiment, the said process comprises using an isocyanate concentration of the reaction product of step (c) of at least 5%.

The invention also relates to a method of use of the said aqueously dispersible polyurethane for the preparation of coating compositions, comprising the steps of admixing to the aqueously dispersible polyurethane at least one additive selected from the group of wetting agents, defoamers, antisettling agents, levelling agents, biocides, and coalescing agents, optionally pigments and colourants, to form a binder mixture, combining the binder mixture thus prepared with at least one crosslinking agent selected from the group consisting of capped and uncapped isocyanates, aminoplast crosslinkers, alkoxycarbonylamino triazines, and phenoplast resins, and applying the mixture of binder and crosslinking agent to a substrate by spraying, dipping, brushing, blade coating, curtain coating or roller coating, and drying the coated substrate optionally at elevated temperature to form a coating film on the said substrate.

Preferably, the range for the degree of branching measured as specific amount of substance of tertiary and/or quaternary aliphatic carbon atoms is from 0.05 mol/kg to 0.4 mol/kg, and the range for the specific amount of urea groups of formula I,

>N—CO—N<,                    (I)

is from 1.0 mol/kg to 1.80 mol/kg, and the range for the specific amount of substance of hydroxyl groups, —OH, is from 1.2 mol/kg to 3.5 mol/kg.

Particularly preferably, the range for the degree of branching measured as specific amount of substance of tertiary and/or quaternary aliphatic carbon atoms is from 0.1 mol/kg to 0.35 mol/kg, and the range for the specific amount of urea groups of formula I, >N—CO—N<, is from 1.0 mol/kg to 1.7 mol/kg, and the range for the specific amount of substance of hydroxyl groups, —OH, is from 1.4 mol/kg to 3.5 mol/kg.

With special emphasis, the range for the degree of branching measured as specific amount of substance of tertiary and/or quaternary aliphatic carbon atoms as defined hereinabove is from 0.2 mol/kg to 0.33 mol/kg, and the range for the specific amount of urea groups of formula I, >N—CO—N<, is from 1.0 mol/kg to 1.8 mol/kg, and the range for the specific amount of substance of hydroxyl groups, —OH, is from 1.4 mol/kg to 3.5 mol/kg.

For all such parameters which relate to the ratio b(X) of the amount of substance n(X) for a particular chemical group X, viz. tertiary or quaternary aliphatic carbon atoms which correspond to the degree of branching, urea groups, or hydroxyl groups, to the mass of the resin, m(Resin), defined by b(X)=n(X)/m(Resin), also referred to as the specific amount of substance, in accordance with DIN 32 625, m(Resin) is the mass of the polyurethane.

The hydroxy-functional polymers A, also referred to as "polyols" hereinafter, have a number average molar mass $M_n$ of at least 400 g/mol, and on average more than one hydroxyl group per molecule, and preferably have a number average molar mass $M_n$ of from 500 g/mol to 5000 g/mol, in particular from 800 g/mol to 2000 g/mol. Their hydroxyl number is in general from 30 mg/g to 280 mg/g, preferably from 50 mg/g to 200 mg/g, and in particular from 70 mg/g to 160 mg/g.

Examples of such polyols, which are the compounds well known from polyurethane chemistry, are polyether-polyols, polyester-polyols, polycarbonate-polyols, polyesteramide-polyols, polyamido-polyols, epoxy resin polyols and reaction products thereof with $CO_2$, and polyacrylate polyols. Such polyols, which can also be employed as mixtures, are described in, for example, in the patents and patent applications DE 20 20 905 A, DE 23 14 513 C3 and DE 31 24 784 C2, and in EP 0 120 466 A1.

Of these polyols, the polyether- and polyester-polyols are preferred, in particular those which contain only terminal OH groups and have a functionality of less than 3, preferably from 2.8 to 2 and in particular from 2.4 to 2.0. Polyols having a hydroxyl functionality in excess of two are a convenient means to introduce further branching into the resulting polyurethane, where these branches derived from constituents having a functionality or more than two count, of course, in the degree of branching per condition (bb) of this invention.

Polyether-polyols which may be mentioned here are, for example, polyoxyethylene-polyols, polyoxypropylene-polyols and polyoxybutylene-polyols, and preferably polytetrahydrofurans having terminal OH groups.

The polyester-polyols which are particularly preferred according to the invention are the known polycondensates of di- and optionally poly-(particularly tri-, and tetra-)-ols and di- and optionally poly-(particularly tri-, and tetra-)-carboxylic acids, or hydroxycarboxylic acids or lactones. Instead of the free acids, the corresponding acid anhydrides or corresponding esters of lower alcohols having from one to four carbon atoms can also be used for preparing the polyesters. Examples of suitable diols are ethylene glycol, butylene glycol, diethylene glycol, triethylene glycol, polyalkylene glycols such as polyethylene glycol, and also 1,2- and 1,3-propanediol, 1,2- and 1,4-butanediol, 1,6-hexanediol, neopentyl glycol or neopentyl glycol hydroxypivalate. As polyols which may also be employed, trimethylolpropane, glycerol, erythritol, pentaerythritol, trimethylolbenzene or trishydroxyethyl isocyanurate may be mentioned here by way of example.

Suitable dicarboxylic acids are aromatic and cycloaliphatic dicarboxylic acids and alkyl- and alkenyldicarboxylic acids, and dimeric fatty acids. Examples are: phthalic acid, isophthalic acid, terephthalic acid, tetrahydrophthalic acid, hexahydrophthalic acid, cyclohexane dicarboxylic acid, adipic acid, azelaic acid, sebacic acid, glutaric acid, chlorendic acid, tetrachlorophthalic acid, maleic acid, fumaric acid, itaconic acid, malonic acid, suberic acid, 2-methylsuccinic acid, 3,3-diethylglutaric acid, 2,2-dimethylsuccinic acid, octenylsuccinic acid and dodecenylsuccinic acid. Anhydrides of these acids, where they exist, can also be used.

Consequently, the anhydrides are included in the term "acid". It is also possible to use small amounts of monocarboxylic acids such as benzoic acid and hexanoic acid.

Saturated aliphatic or aromatic acids, such as adipic acid or isophthalic acid, are preferred. As a polycarboxylic acid which may be used in smaller amounts, trimellitic acid may be mentioned here, and also polyanhydrides as described in the patent application DE 28 11 913 A1, or mixtures of two or more such compounds.

The hydroxycarboxylic acids which can be used as reactants in the preparation of a polyester-polyol having terminal hydroxyl groups include, for example, hydroxycaproic acid, hydroxybutyric acid, hydroxydecanoic acid, hydroxystearic acid and the like. Lactones which can be used include caprolactone, butyrolactone and the like.

The mass fraction of moieties derived from the polyol component in the polyurethane resin (mass of A used in the synthesis divided by mass of the resin) is usually between 15% and 80%, preferably between 40% and 60%.

The polyhydric organic compounds A' having at least three hydroxyl groups per molecule are preferably aliphatic alcohols having from 3 to 20 carbon atoms, such as glycerol, trimethylol ethane, trimethylol propane, trimethylol butane, pentaerythritol, and sugar alcohols such as mannitol and sorbitol, and ether alcohols such as diglycerol, ditrimethylol propane, and dipentaerythritol. The introduction of tri- or polyhydric alcohols is a convenient means of increasing the hydroxyl number of the polyurethane resin.

The silicon-containing polyols A1 are preferably polydimethylsiloxane derivatives that are terminally functionalised with organic groups, particularly preferred aliphatic groups, having each exactly one functional hydroxyl group. The organic group, which is preferred to be an aliphatic group, is in a particularly preferred mode an alkylene group which is directly chemically bound to a terminal silicon atom of a polydimethylsiloxane chain. This organic group preferably has exactly one functional hydroxyl group. The preferred silicon-containing polyols A1 are therefore difunctional with respect to their hydroxyl functionality.

In a further preferred mode, silicon functionality may be introduced in to the polyurethane molecules by providing an isocyanate-functional urethane prepolymer having at least the necessary characteristics leading to the condition (cc) being fulfilled after reaction step (c), but using no silicone-containing polyol A1 in step (a). This isocyanate-functional prepolymer is then reacted before step (d) or during step (d), or immediately after step (d), if there are residual isocyanate groups left, with a polysiloxane A1' also obeying formula III, that has only one hydroxyl functionality. This reaction sequence has the effect that the polysiloxane moieties are exclusively located at the chain ends of the polyurethane molecules. In the experiments underlying this invention, it has been found that the degree of silicon modification may be reduced by at least 5% compared to an otherwise similar polyurethane which is modified by a silicon-containing diol or polyol, this degree being measured by the mass fraction w(Si) of silicon in the polyurethane, which mass fraction w(Si) is calculated by dividing the mass m(Si) of silicon in a given mass m(PU) of polyurethane by that mass m(PU) of polyurethane, although preserving the same level of solvent resistance and anti-graffiti properties.

The hydroxy-functional or amino-functional acids B1 which have at least one, and preferably two, hydroxyl or amino groups and at least one acid group, are described, for example, in U.S. Pat. Nos. 3,412,054 and 3,640,924, and in the DE patent 26 24 442 B2 and the DE patent application 27 44 544 A1, to which reference is made here. Polyols, preferably diols, which are particularly suitable in this respect are those having at least one carboxyl group and in general from 1 to 3 carboxyl groups per molecule. Suitable groups capable of anion formation also include sulphonic acid groups. Examples of such compounds are dihydroxycarboxylic acids, such as alpha,alpha-dialkylolalkanoic acids, in particular alpha,alpha-dimethylolalkanoic acids, such as 2,2-dimethylolacetic acid, 2,2-dimethylolpropionic acid, 2,2-dimethylolbutyric acid, 2,2-dimethylolpentanoic acid, tartaric acids, and also polyhydroxy acids, such as gluconic acid. Particularly preferred among these are 2,2-dimethylolpropionic and 2,2-dimethylolbutyric acids. Examples of compounds B1 containing amino groups are alpha,delta-diaminovaleric acid, and 2,4-diaminotoluene-5-sulphonic acid. It is also possible to employ mixtures of these compounds B1. The mass fraction of component B1 in the polyurethane resin (mass of B1 used in the synthesis divided by mass of the resin) is in general from 2% to 20%, preferably from 4% to 10%.

The polyethers B2 have oligo-oxyethylene groups obeying the formula II

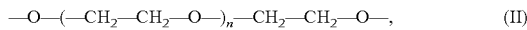
$$-O-(-CH_2-CH_2-O-)_n-CH_2-CH_2-O-, \quad (II)$$

wherein n is from 1 to 100, and at least one, preferably two hydroxyl groups, they comprise lateral or terminal oxyethylene groups of the formula II supra, and are incorporated into the polyurethane resin by reaction of an at least monovalent alcohol or an at least monovalent amine comprising the structure of the formula II supra with an isocyanate group present in the reaction mixture. Preferably, the mass fraction of compounds B2 used in the synthesis is chosen such that the mass fraction w(II) of groups of formula II in the polyurethane resin is at least 1%, preferably at least 3%. The mass fraction w(II) of these groups of formula II is calculated as the ratio of the mass m(II) of groups of formula II and the mass of the polyurethane resin m(PU), and should not exceed 10%, and preferably, not 7%, as the water and humidity resistance would then be adversely affected. The lower range of mass fractions of components B1 and B2 is preferably used if both are present.

The polyurethane of the present invention comprises building blocks derived from multifunctional isocyanates C of formula $Q(NCO)_j$ where Q is an at least divalent hydrocarbon radical having from four to forty carbon atoms, and where j is an integer of at least 2, and also, isocyanurates, biurets, allophanates, and uretdiones derived from any of these multifunctional isocyanates, wherein the multifunctional isocyanates may be aliphatic, cycloaliphatic, aromatic, or aromatic-aliphatic, the building blocks having the structure $-(CO-NH-)_{j-i}-Q-(N=C=O)_i$, where the average of i over all molecules present in the aqueously dispersed polyurethane assumes a value of from 0 to j−0.001. This takes into account the fact that residual isocyanate groups may remain in the polymer which are not converted, e.g. to urethane groups by addition of hydroxyl groups, or to urea groups, by addition of amino groups.

The multifunctional isocyanates C are defined by formula $Q(NCO)_j$ where j is an integer of at least 2, and also, isocyanurates, biurets, allophanates, and uretdiones derived from any of these multifunctional isocyanates, and may be aliphatic, cycloaliphatic, aromatic, or aromaticaliphatic, and are selected from the group consisting of diisocyanates, isocyanates having three or more isocyanate groups, and also, isocyanurates, biurets, allophanates, and uretdiones derived from any of these di- or polyfunctional isocyanates. The diisocyanates which are suitable are compounds which are known in the polyurethane and paints sector, such as aliphatic, cycloaliphatic or aromatic diisocyanates. These are preferably of the formula $Q(NCO)_2$, where Q is a divalent hydrocarbon radical having from 4 to 40 carbon atoms, in particular from 4 to 20 carbon atoms and is preferably an aliphatic hydrocarbon radical having from 4 to 12 carbon atoms, a cycloaliphatic hydrocarbon radical having from 6 to 15 carbon atoms, an aromatic hydrocarbon radical having from 6 to 15 carbon atoms, or an aralphatic hydrocarbon radical having from 7 to 15 carbon atoms. Examples of such diisocyanates which are to be employed with preference are tetramethylene diisocyanate, hexamethylene diisocyanate, dodecamethylene diisocyanate, 1,4-diisocyanatocyclohexane, 3-isocyanatomethyl-3,5,5-trimethylcyclohexyl isocyanate (isophorone diisocyanate), 4,4'-diisocyanatodicyclohexylmethane, 2,2-(4,4'-diisocyanato)dicyclohexylpropane, 1,4-diisocyanatobenzene, 2,4- or 2,6-diisocyanatotoluene or mixtures of these isomers, 4,4'- or 2,4'-diisocyanatodiphenylmethane, 2,2-(4,4'-diisocyanato)diphenylpropane, p-xylylene diisocyanate and alpha, alpha, alpha', alpha'-tetramethyl-m- or -p-xylylene diisocyanate, and mixtures comprising these compounds.

The hydroxyamines D having at least one primary or secondary amino group, and at least one hydroxyl group, are aliphatic compounds having one or more primary amino groups and one or more primary hydroxyl groups, one or more secondary amino groups and one or more primary hydroxyl groups, one or more primary amino groups and one or more secondary or tertiary hydroxyl groups, or one or more secondary amino groups and one or more secondary or tertiary hydroxyl groups. It is also possible to use hydroxyamines that have hydroxyl groups and both primary and secondary amino groups. Particularly preferred are ethanolamine, N-aminoethylethanolamine, diethanolamine, 4-hydroxymethylpiperidine, 2-hydroxypropylamine, 3-aminopropanol, N,N-bis-(2-hydroxypropyl)amine(diisopropanolamine), N,N'-bis-(2-hydroxyethyl)ethylene diamine, neopentanolamine and particularly preferably diethanolamine.

The polyhydric alcohols E having at least two hydroxyl groups per molecule, and a molar mass of less than 400 g/mol are selected from dihydric aliphatic alcohols having from 2 to 40 carbon atoms, such as ethylene glycol, 1,2- and 1,3-propane diol, 1,2- and 1,4-butane diol, glycerol, trimethylol propane, pentaerythritol, diglycerol, ditrimethylol propane, and dipentaerythritol, and dimeric fatty alcohols. The introduction of tri- or polyhydric alcohols is a convenient means of increasing the hydroxyl number of the polyurethane resin.

The polyfunctional amines F having at least two amino groups, where preferably at least two amino hydrogen atoms have different reactivity, being derived from either a primary, or a secondary amino group. Particularly useful compounds include amines such as the primary/secondary amines 3-amino-1-methylaminopropane, 3-amino-1-ethylaminopropane, 3-amino-1-cyclohexylaminopropane and 3-amino-1-methylaminobutane.

Optionally, the polyurethane resin according to the invention can also contain small amounts of components G, which are derived from so-called chain extenders. These compounds include those known in this context which are reactive with isocyanate groups and are preferably at least difunctional with regard to isocyanate functional reactants. Examples of these are water, hydrazine and derivatives thereof, diamines and polyamines such as ethylenediamine, diethylene triamine, triethylene tetramine, tetraethylene pentamine, 1,2- and 1,3-diaminopropane, isophorone diamine, 2- and 3-methylpentane diamine, and hexamethylene diamine, which may also carry further substituents such as hydroxyl groups. Such polyamines are described in the German patent application DE 36 44 371 A1. The mass fraction of moieties derived from this component G in the polyurethane resin is usually between 1% and 10%, preferably between 2% and 5%. These chain extenders G may also comprise the molecules mentioned as components F and differ from these at least inasmuch as they are added in the last step e) of the process to make the isocyanate functional reaction product of step d).

The preparation of the polyurethane resin employed in accordance with the invention is preferably carried out by first preparing a polyurethane prepolymer from the polyisocyanates C, the mixture A of polyols, and the compounds B1 and/or B2 and optionally, B3, this prepolymer having on average at least 1.7, preferably from 2 to 2.5, free isocyanate groups per molecule. This prepolymer is then reacted in a non-aqueous system which may be in the melt, or dissolved in an organic solvent which may later be removed, with at least one of hydroxyamines D, polyhydric alcohols E, and polyfunctional amines F, under consumption of the remaining isocyanate groups, optionally neutralising the fully reacted polyurethane resin and transferring it to an aqueous system. The solvent used has to be chosen such that it does not react with isocyanate functional compounds. If desired, reaction with the chain extender G can be carried out either in the solvent or melt, or can also be carried out after transfer to the aqueous system. It goes without saying that a part of the chain extender may also be added before, and the rest after transfer to the aqueous phase.

Preparation of the polyurethane prepolymer is carried out according to known processes. The polyisocyanate is employed in excess relative to the hydroxy functional components to result in a product having free isocyanate groups. These isocyanate groups are terminal and/or lateral, preferably terminal. It is expedient for the amount of polyisocyanate to be such that the ratio of the amounts of substance $n(-NCO)$ of isocyanate groups to the amount of substance $n(-OH)$ of hydroxyl groups in the hydroxy functional components is from 1.05 mol/mol to 2 mol/mol, preferably from 1.2 mol/mol to 1.9 mol/mol.

In the preparation of the prepolymer, the reaction is normally carried out at temperatures of from 60° C. to 140° C., preferably from 100° C. to 130° C., depending on the reactivity of the isocyanate employed, and as a rule in the absence of a catalyst but optionally in the presence of solvents which are inert toward isocyanates. In the case of using solvents, the temperatures mentioned supra maybe chosen lower, depending on the reactivity of the isocyanate selected.

Suitable solvents in this respect are in particular those which are compatible with water, such as ethers, ketones and esters, and also N-methylpyrrolidone or N-ethylpyrrolidone. The amount of this solvent should preferably not exceed a mass fraction of 20% in the solution of the resin or its educts or starting materials, and is preferably in the range from 5% to 15%. This process can therefore be used to prepare polyurethane dispersions having a low VOC content (defined in the EU as "A VOC is any organic compound having an initial boiling temperature less than or equal to 250° C. measured at a standard atmospheric pressure of 101.3 kPa and can do damage to visual or audible senses.") It is expedient to add the polyisocyanate to the solution of the remaining components. However it is also possible first to add the polyisocyanate C to the polyol component A and react the resulting prepolymer with component D, in the melt or dissolved in a solvent which is inactive towards isocyanates and is preferably a pyrrolidone derivative or a ketone.

The prepolymer or its solution is then reacted with one or more of components E, F, and G, the temperature expediently being in the range from 50° C. to 110° C., preferably between 70° C. and 110° C., until the content of free isocyanate groups in the prepolymer has fallen virtually to zero. If a chain extender G is used, it has proved to be advantageous to add at least a part of the chain extender only in the aqueous phase as this helps to keep the viscosity down and manageable, if the reaction is conducted in the melt. If compound E is employed, it is added in excess. In this case the amount of E is preferably such that the ratio of the amount of substance of isocyanate groups in the prepolymer, already reacted beforehand if appropriate with compounds F and/or G, to reactive groups in E is 1:1.1 to 1:5. The mass of F and/or G here can be from 0% to 90%, preferably from 0.5% to 20%, of the mass of E.

It is also possible to react a portion of the (non-neutralised) acid groups which may be present in the polyurethane resin if compounds according to B1 are used, preferably from 5% to 30% of these acid groups, with difunctional compounds which react with acid groups, such as diepoxides.

Tertiary amines are particularly suitable to neutralise the resulting product which preferably contains COOH groups as acid groups if compounds B1 are used for example trialkylamines having from 1 to 12, preferably from 1 to 6 carbon atoms in each alkyl radical. Examples of these compounds are trimethylamine, triethylamine, methyldiethylamine, 2-(N,N-dimethylamino)2-methyl-propanol-1, and tripropylamine. The alkyl radicals can also contain, for example, hydroxyl groups, as in the case of the dialkylmonoalkanolamines, alkyldialkanolamines and trialkanolamines. An example of such a compound is dimethylethanolamine, which is used preferably as the neutralising agent.

Neutralising agents which can be employed also include, if appropriate, inorganic bases such as ammonia, or sodium or potassium hydroxide.

The neutralising agent is usually employed in a molar ratio with regard to the acid groups of the prepolymer of about 0.3 mol:1 mol to 1.3 mol:1 mol, preferably from about 0.5 mol:1 mol to 1 mol:1 mol.

Inorganic acids such as nitric acid, sulfuric acid, or phosphoric acid, or more preferred, volatile organic acids such as acetic acid and formic acid, or still more preferably acids that decompose upon heating such as acetoacetic acid, may be used to neutralise the resulting product which preferably contains tertiary amino groups as basic groups if compounds B3 are used.

The neutralising agent is usually employed in a molar ratio with regard to the basic groups of the prepolymer of about 0.3 mol:1 mol to 1.3 mol:1 mol, preferably from about 0.5 mol:1 mol to 1 mol:1 mol.

Neutralisation which is usually carried out at between room temperature and 110° C. can be performed in any desired manner, for example by adding the water-containing neutralising agent to the polyurethane resin or vice versa. However, it is also possible first to add the neutralising agents to the polyurethane resin and only then to add the water. In general this results in a mass fraction of solids of from 20% to 70%, preferably from 30% to 50%.

The mass fraction of polyurethane resin in the final aqueous coating preparation additionally comprising additives, pigments, fillers, extenders, crosslinkers, etc. is in general from 5% to 40%, preferably from 15% to 30%.

The resulting polyurethane dispersions may be used as binders in coating compositions together with crosslinking components, where the so-called one pack coating compositions comprise crosslinking components that do not, or at least not to a large extent, react with the hydroxy-functional polyurethane at ambient conditions, viz., at room temperature or slightly elevated temperature of not more than 60° C. Such crosslinking components are blocked or capped multifunctional isocyanates, which isocyanates may also be hydrophilically modified, or aminoplast resins, particularly melamine-formaldehyde resins or other triazine-derived resins, phenoplast resins such as resinous reaction products of phenol or cresol with formaldehyde, or alkoxycarbonylamino triazines, and mixtures of these crosslinking components. Multifunctional isocyanates having free isocyanate groups react with hydroxy-functional polyurethanes already at room temperature, and may therefore only be mixed with a hydroxy-functional polyurethane immediately before use, such mixtures being referred to as two-pack coating compositions. These crosslinking components, and the one-pack or two-pack coating compositions are amply described in the art.

They may also contain additional constituents, such as further hydroxy functional binder resins which serve to modify the application properties of the coating compositions prepared therewith, such as elasticity and gloss.

The resulting coating compositions comprising the aqueously dispersible polyurethane according to the invention are suitable for practically all those areas of application in which solvent-containing, solvent-free or other kinds of aqueous coating systems having an enhanced profile of properties are currently used; the substrates to be coated may consist, for example, of metal, mineral construction materials such as concrete, cement or gypsum, fibre-reinforced concrete construction materials, timber or wooden materials, paper, cardboard, polymer films, asphalt, bitumen, plastics of various kinds, textiles or leather.

The presence of moieties derived from silicon-containing hydroxy-functional polymers A1, and of urea structures in the mass fractions as detailed supra in the aqueously dispersible polyurethane leads to the finding that surfaces coated on its top surface with a coating composition containing the said aqueously dispersible polyurethane can easily be cleaned, do not easily pick up dirt, and are not permanently stained by permanent or removable inks applied with felt-tip permanent or removable markers.

Surprisingly, it had been discovered that coating compositions prepared from the aqueously dispersible polyurethane according to this invention form coatings with particularly good adhesion on polymer films, particularly on polycarbonate sheets and polyester (PETP) films. As the presence of silicon in a polymer usually impairs the adhesion properties, it was not expected that the adhesion would be similar, nor even better, than in the case of a non-modified polyurethane.

The invention is further illustrated in the following examples which are not to be construed as limiting.

The following parameters and analytical methods were used:

The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g". Measurement is effected in strict accordance with the standard.

The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g". Measurement is effected in strict accordance with the standard.

Concentrations are generally (unless otherwise stated) mass fractions, i.e., the ratio of the mass $m_B$ of the constituent B in question to the mass m of the mixture, and are usually stated in %, or in cg/g. Isocyanate concentration, therefore, is the mass of isocyanate groups (—N=C=O, molar mass 42.02 g/mol) present in a mixture, divided by the mass of that mixture, and is measured in accordance with DIN EN ISO 11 909.

Specific amount b(X) of substance of a constituent or functional group (amount of substance n(X) of a constituent or functional group in a mixture, divided by the mass m of the mixture, here for urea groups >N—CO—N<, hydroxyl groups —OH, or branches which are here tertiary or quaternary aliphatic carbon atoms) is referred to as "content" for simplicity, and usually measured in mmol/g or the ratio of SI basic units, mol/kg, showing the same numerical value.

The specific amount of silicon in a sample, n(Si)/m (sample), where n(Si) is the amount of substance of silicon, and m(sample) is the mass of the sample (solid polyurethane), was calculated from the mass fraction of silicon in the sample as determined by elemental analysis following total oxidation of the organic matter with perchloric acid ($HClO_4$), weighing the residue, and then converting the silicon dioxide formed in the residue to $SiF_4$ by treatment with HF, and determining the mass difference, in the known way, to find the mass of silicon in the sample. Conversion of mass to amount of substance is done, in the known way, by using the molar mass of silicon, which is 28.0855 g/mol. The specific amount of urea groups was determined by integrating the proton NMR signal of the —NH—CO—NH groups measured on films of the polyurethane. A calibration curve was made to correct the signal. The specific amount of tertiary and of quaternary carbon atoms was determined by $^{13}$C-NMR on a solid polyurethane film, and verified by calibration.

The mass fraction of solids of the polyurethane dispersions was determined in the usual way according to ISO 3251 (sample of 1 g, drying time 1 h, temperature 125° C.).

Example 1—Preparation of Polyester A

A mixture of 1180 g of 1,6-hexane diol and 1165 g of adipic acid were charged, 280 g of xylene was admixed, and the mixture was heated to 220° C. Water formed in the reaction was distilled off via formation of an azeotrope with xylene. After reaching the theoretical amount of water (287 g) and an acid number of less than 3 mg/g, the azeotrope former was distilled off under reduced pressure, and the remaining polyester was cooled to ambient temperature.

In the residue, the mass fraction of solids was 100%, and the hydroxyl number was 110 mg/g.

Example 2—Polyurethane Dispersion

A mixture of 1067 g of the polyester A of example 1, 291 g of alpha,alpha-dimethylolpropionic acid, and 175 g of trimethylolpropane was heated to 60° C. with stirring. 2274 g of m-tetramethylxylylene diisocyanate were added, and the resulting mixture was stirred and heated to 120° C. At that temperature the reaction was continued until the mass fraction of isocyanate groups (—N=C=O) was less than 9.1%. The mixture was cooled to 90° C., and a mixture of 1000 g of trimethylolpropane and 2000 g of methyl isobutyl ketone was added. The temperature of the mixture rose to more than 100° C. due to the heat of reaction; after stirring for one hour, the mixture was cooled to below 100° C. At 98° C., a mixture of 194 g of N,N-dimethylethanolamine and 550 g of distilled water was added. This mixture was stirred for thirty minutes. Immediately thereafter, the polymer solution was dispersed in 12.5 kg of distilled water at 80° C., then the solvent methylisobutyl ketone was distilled off. The following parameters were determined on this dispersion:
Urea Content: 0 mol/kg
Si content: 0 mol/kg
Mass Fraction of Solids: 28.1%
pH: 8.7 (measured as detailed supra)
dynamic viscosity: 540 mPa·s (measured as detailed supra)

Example 3—Polyurethane Dispersion

A mixture of 241.6 g of a hydroxyfunctional polycarbonate based on 1,6-hexane diol (OH number: 110 mg/g; commercially obtainable as Desmophen® XP 2586, Bayer Material Science AG), 19.4 g of a hydroxy-functional polydimethylsiloxane having on average twelve silicon atoms, and exactly two —Si—$(CH_2)_3$—OH end groups in a polymer molecule (WACKER® silicone IM 11), 49.7 g of 2,2-dimethylolpropionic acid and 13.2 g of trimethylol propane was heated to 60° C. with stirring. 345 g of m-tetramethylxylylene diisocyanate were added and the resulting mixture was stirred and heated to 120° C. At that temperature the reaction was continued until the mass fraction of isocyanate groups (—N=C=O) was less than 8.0%. The mixture was cooled to 90° C., and 118.9 g of diethanolamine were added. The reaction mass was heated via exothermy to 130° C., after stirring for one hour at this temperature, the mixture was cooled to 98° C. At this temperature, a mixture of 33 g of N,N-dimethylethanolamine and 350 g of water was added, and the resulting mixture was stirred for thirty minutes. Immediately thereafter, the reaction mass was dispersed by addition of 1100 g of distilled water at 80° C. and stirred for one hour. The following parameters were determined on this dispersion:
Urea Content: 1.44 mol/kg
Si Content: 0.241 mol/kg
Mass Fraction of Solids: 39.4%
pH: 7.9 (measured as detailed supra)
dynamic viscosity 290 mPa·s (measured as detailed supra)

Example 4—Polyurethane Dispersion

A mixture of 61.8 g of a polycarbonate diol based on 1,6-hexane diol (OH number 110 mg/g; commercially available as Desmophen® XP 2586, Bayer Material Science AG), 16.9 g of 2,2dimethylolpropionic acid, and 10.1 g of trimethylolpropane was heated to 60° C. with stirring. 132 g of m-tetramethylxylylene diisocyanate were added and the resulting mixture was stirred and heated to 120° C. At that temperature, the reaction was continued until the mass fraction of remaining isocyanate groups in the reaction mixture was less than 9.1%. The prepolymer was cooled to 90° C., and 45.4 g of diethanolamine were added. The temperature of the reaction mixture rose due to the exothermic reaction, and was cooled after one hour of stirring to 98° C.

At this temperature, a mixture of 11 g of N,N-dimethylethanolamine and 33 g of distilled water was added, and the resulting mixture was stirred for thirty minutes. The polymer was then dispersed with 350 g of distilled water at 80° C., and stirred for one hour.

The following parameters were determined on this dispersion:
Urea content: 1.63 mol/kg
Si content: 0 mol/kg
mass fraction of solids: 40.1%
pH: 8.4 (measured as detailed supra)
dynamic viscosity 520 mPa·s (measured as detailed supra)

Example 5—Polyurethane Dispersion

A mixture of 990.6 g of a polycarbonate diol based on 1,6-hexane diol (OH number 110 mg/g; commercially available as Desmophen® XP 2586, Bayer Material Science AG), 63.5 g of the polysiloxane of Example 3, and 161 g of 2,2-dimethylolpropionic acid was heated to 60° C. with stirring. 996 g of m-tetramethylxylylene diisocyanate were added and the resulting mixture was stirred and heated to 120° C. At that temperature, the reaction was continued until the mass fraction of remaining isocyanate groups in the reaction mixture was less than 7.0%. The prepolymer was cooled to 90° C., and 343 g of diethanolamine were added. The temperature of the reaction mixture rose due to the exothermic reaction, and was cooled after one hour of stirring to 98° C. At this temperature, a mixture of 106 g of N,N-dimethylethanolamine and 400 g of distilled water was added, and the resulting mixture was stirred for thirty minutes. The polymer was then dispersed with 3300 g of distilled water at 80° C., and stirred for one hour. The following parameters were determined on this dispersion:
Urea content: 1.28 mol/kg
Si content: 0.244 mol/kg
mass fraction of solids: 40.7%
pH: 7.8 (measured as detailed supra)
dynamic viscosity 88 mPa·s (measured as detailed supra)

Example 6—Polyurethane Dispersion

A mixture of 290 g of a polycarbonate diol based on 1,6-hexane diol (OH number 110 mg/g; commercially available as Desmophen® XP 2586, Bayer Material Science AG), 80.4 g of the polysiloxane of Example 3, 101 g of 2,2-dimethylolpropionic acid, and 60.6 g of trimethylolpropane was heated to 60° C. with stirring. 788 g of m-tetramethylxylylene diisocyanate were added and the resulting mixture was stirred and heated to 120° C. At that temperature, the reaction was continued until the mass fraction of remaining isocyanate groups in the reaction mixture was less than 9.1%. The prepolymer was cooled to 90° C., and 272 g of diethanolamine were added. The temperature of the reaction mixture rose due to the exothermic reaction, and the mixture was cooled after one hour of stirring to 98° C. At this temperature, a mixture of 67 g of N,N-dimethylethanolamine and 199 g of distilled water was added, and the resulting mixture was stirred for thirty minutes. The polymer was then dispersed with 2100 g of distilled water at 80° C., and stirred for one hour. The following parameters were determined on this dispersion:
Urea content: 1.63 mol/kg
Si content: 0.495 mol/kg
mass fraction of solids: 41.3%
pH: 7.7 (measured as detailed supra)
dynamic viscosity 500 mPa·s (measured as detailed supra)

Example 7—Performance Test

Coating compositions were prepared from each of the dispersions of examples 2 to 6 according to the following recipe:
Part 1:
  250 g of the dispersions of examples 2 to 6 each,
    −0.5 g of a levelling and substrate wetting agent based on a polyether modified polysiloxane (®Additol VXW 6503, Cytec Austria GmbH)
  0.5 g of a nonionic surfactant (®Surfynol 104, Air Products and Chemicals Inc.)
    −25 g of water to adjust the viscosity of the mixture of Part 1 to from 250 mPa·s to 350 mPa·s (measured at 23° C. and a shear rate of 100 s$^{-1}$)

Part 2:
  −70 g of a hydrophilically modified aliphatic polymeric isocyanate based on hexamethylene diisocyanate having a mass fraction of isocyanate groups (v. s.) of 17.4% (®Bayhydur 3100, Bayer Material Science AG)

Coating film properties were tested on films obtained by applying a wet film with a thickness of 200 μm to clean glass plates (rinsed with isopropanol and dried for thirty minutes at 80° C.), and forced drying of the coating films at 70° C. for twelve hours. The results of the application testing, hardness measured according to the procedure of König, DIN EN ISO 1522, and acetone resistance were recorded after letting the glass plates rest for twelve hours at ambient temperature.

Acetone resistance was determined by applying a cotton pad soaked with acetone onto the coating film surface, and testing after defined periods of time the treated part of the coating film for its solvent resistance, viz., every thirty seconds the film was tested for having become soft, sticky or destroyed. The time stated in minutes is when the surface of the coating film showed the first sign of being affected. The results are compiled in the following table:

TABLE 1

Test results

| | Dispersion of Example | | | | |
|---|---|---|---|---|---|
| | 2 | 3 | 4 | 5 | 6 |
| urea content in mol/kg | 0 | 1.44 | 1.63 | 1.28 | 1.63 |
| Si content in mol/kg | 0 | 0.241 | 0 | 0.244 | 0.495 |
| Graffiti Test$^a$ | 0 | 4 | 3 | 4 | 5 |
| Pendulum Hardness in s | 105 | 119 | 160 | 118 | 183 |
| Acetone Resistance in min | 90 | 240 | 600 | 120 | 240 |
| Polyester Film Adhesion$^b$ | 5 | 0 | 5 | 1 | 0 |

$^a$Test according to ASTM D 6578: several lines with a solvent containing red and black pen were applied onto the cured coating film, and five minutes later, the marker lines were removed with a cotton sheet The performance was rated according to the standard, with 0 as worst and 5 as best: 5 = Marker are fully removable, no residual pigment 4 = Marker are good removable, little remaining pigment visible 3 = Marker are fully removable with ethanol, no remaining pigment 2 = Marker are good removable with ethanol, little remaining pigment visible 1 = Marker are not removable, pigment remains
$^b$Cross-cut test with tape pull-off; with two rows of cuts through the cross-linked paint film oriented in a 90° angle with respect to each other, spaced by 1 mm, in a square field of 5 mm × 5 mm; "5" indicates no adhesion to the substrate (all squares cut from the paint film within the square field adhere to the adhesive tape after pull-off), "0" indicates full adhesion to the substrate (none of the squares cut into the paint film within the square field adhere to the adhesive tape after pull-off), intermediate numbers stand for intermediate results.

The invention claimed is:
1. An aqueously dispersible polyurethane which comprises building blocks derived from hydroxy-functional polymers $A_i$ by removal of a hydrogen atom from at least one hydroxyl group —OH of hydroxy-functional polymers $A_i$ having a number average molar mass of at least 400 g/mol, and, on average, more than one hydroxyl group per molecule, where i is at least two, and which comprises a mass fraction of from 2 to 20% of building blocks derived from acids B1 which have at least one hydroxyl group or at least one amino group and at least one acid group, by removal of a hydrogen atom from at least one hydroxyl group —OH or amino group >NH of the said acids B1, and which further comprises building blocks derived from isocyanates C of formula $Q(NCO)_j$ where Q is an at least divalent hydrocarbon radical having from four to forty carbon atoms, and where j is an integer of at least 2, and also, from isocyanurates, biurets, allophanates, and uretdiones derived from any of these isocyanates, wherein the isocyanates may be aliphatic, cycloaliphatic, aromatic, or aromatic-aliphatic, the building blocks having the structure —(CO—NH—)$_{j-i}$-Q-(N=C=O)$_i$, where the average of i over all molecules present in the aqueously dispersed polyurethane assumes a value of from 0 to j−0.001 and wherein hydroxyl-functional polymers $A_i$ comprises a mass fraction of at least 1%, and up to 60%, of a silicon-containing hydroxy functional polymer A1 which is a polydimethylsiloxane terminally functionalised with alkylene groups $R^5$ and $R^6$ having each exactly one hydroxyl group of formula III

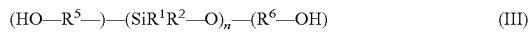 (III)

wherein
$R^1$ is methyl,
$R^2$ is methyl,
$R^5$ is selected from the group consisting of linear or branched alkylene groups having from one to ten carbon atoms, which alkylene groups are unsubstituted or substituted by one or more groups selected from the group consisting of linear alkyl groups, branched alkyl groups, linear alkoxy groups, and branched alkoxy groups, each of these having from one to ten carbon atoms,
$R^6$ is selected from the same group as $R^5$, but independently thereof, and
n is from 2 to 100,
wherein said silicon-containing polyol A1 is introduced into the polyurethane by reaction of said polyol A1 with said at least one polyfunctional isocyanate C having at least two isocyanate groups per molecule, said polyurethane having
(aa) a specific amount of silicon n(Si)/m(PU) of from 0.05 mol/kg to 1 mol/kg,
(bb) a degree of branching measured as the sum of the specific amounts of substance of tertiary aliphatic carbon atoms $C^3$ and of quaternary aliphatic carbon atoms $C^4$, $(n(C^3)+n(C^4))/m(PU)$, of from 0.01 mol/kg to 0.5 mol/kg, which carbon atoms $C^3$ and $C^4$ are derived from trihydric or tetrahydric alcohols,
(cc) a specific amount of urea groups, n(U)/m(PU), wherein the urea groups are according to formula I,

 (formula I)

of from 0.8 mol/kg to 2 mol/kg, and
(dd) a specific amount of substance of hydroxyl groups, n(-OH)/m(PU), of from 1 mol/kg to 4 mol/kg,
wherein in each case the specific amount of substance is calculated as the ratio of the amount of substance n of the entity under consideration to the mass m(PU) of the polyurethane.

2. The aqueously dispersible polyurethane of claim 1 which comprises building blocks derived from acids B1 which have at least one hydroxyl group and at least one acid group, by removal of a hydrogen atom from at least one hydroxyl group —OH of the said acids B1.

3. The aqueously dispersible polyurethane of claim 1 which comprises building blocks derived from hydroxyamines D by removal of a hydrogen atom from at least one hydroxyl group —OH or amino group >NH of the said hydroxyamines D, these hydroxyamines D having at least one primary or secondary amino group, and at least one hydroxyl group, being aliphatic compounds having one or more primary amino groups and one or more primary hydroxyl groups, one or more secondary amino groups and one or more primary hydroxyl groups, one or more primary amino groups and one or more secondary or tertiary hydroxyl groups, or one or more secondary amino groups and one or more secondary or tertiary hydroxyl groups.

4. The aqueously dispersible polyurethane of claim 1 which comprises building blocks derived from polyhydric alcohols E by removal of a hydrogen atom from at least one hydroxyl group —OH of the said alcohols E, these polyhydric alcohols E having at least two hydroxyl groups per molecule, and a molar mass of less than 400 g/mol.

5. The aqueously dispersible polyurethane of claim 1 which comprises building blocks derived from amines F having at least two amino groups by removal of a hydrogen atom from at least one amino group >NH.

6. A process for the preparation of the aqueously dispersible polyurethane of claim 1, comprising the steps of
a. preparing a mixture A of hydroxy-functional polymers $A_i$ having a number average molar mass of at least 400 g/mol, and, on average, more than one hydroxyl group per molecule, where i is at least two, and wherein at least one of the hydroxy-functional polymers $A_i$ is a silicon-containing hydroxy-functional polymer A1 as defined in claim 1 which is difunctional with respect to its hydroxyl functionality, and which is a polydimethylsiloxane terminally functionalised with alkylene groups $R^5$ and $R^6$ having each exactly one hydroxyl group,
b. mixing polymer mixture A with
(b1) an acid B1 which has at least one acid group, and at least one further functional group selected from the group consisting of hydroxyl groups, primary amino groups, and secondary amino groups,
c. reacting the mixture prepared in step b. with at least one polyfunctional isocyanate C having at least two isocyanate groups per molecule, wherein the amount of isocyanate C is chosen such that there is a ratio of the number of isocyanate groups in component C to the number of hydroxyl groups present in the mixture prepared in step b. of from 2:1 to 1.1:1, until at least 90% of the hydroxyl groups of the mixture prepared in step b. are consumed by reaction with the isocyanate component C,
d. adding to the reaction product of step c. at least one of
a hydroxyamine D having at least one primary or secondary amino group, and at least one hydroxyl group,
a polyhydric alcohol E having at least two hydroxyl groups per molecule, and
a polyfunctional amine F having at least two amino groups, each of the amino groups being selected from primary and secondary amino groups,
e. dispersing the reaction product of step d. in water,
wherein the amounts of the reactants A, A1, B1, B2, B3, C, D, E, and F are chosen such that the resultant polyurethane PU fulfills the conditions (aa), (bb), (cc) and (dd) as stated in claim 1.

7. The process of claim 6 wherein the mixture A of hydroxyfunctional polymers has, on average, more than one hydroxyl group per molecule, comprises a mass fraction of at least 1%, and up to 60%, of the silicon-containing hydroxy functional polymer A1.

8. A method of use of the aqueously dispersible polyurethane of claim 1 for the preparation of coating compositions, comprising the steps of admixing to the aqueously dispersible polyurethane at least one additive selected from the group of wetting agents, defoamers, antisettling agents, levelling agents, biocides, and coalescing agents, optionally pigments and colourants, to form a binder mixture, combining the binder mixture thus prepared with at least one crosslinking agent selected from the group consisting of capped and uncapped isocyanates, hydrophilically capped and uncapped isocyanates, aminoplast crosslinkers, alkoxycarbonylamino triazines, and phenoplast resins, and applying the mixture of binder and crosslinking agent to a substrate by spraying, dipping, brushing, blade coating, curtain coating or roller coating, and drying the coated substrate optionally at elevated temperature to form a coating film on the said substrate.

9. The process of claim 6, comprising the steps of
a. preparing a mixture A of hydroxy-functional polymers $A_i$ having a number average molar mass of at least 400 g/mol, and, on average, more than one hydroxyl group per molecule, where i is at least two, and wherein at least one of the hydroxy-functional polymers $A_i$ is a silicon-containing hydroxy-functional polymer A1 which is difunctional with respect to its hydroxyl functionality, and is a polydimethylsiloxane terminally functionalised with alkylene groups $R^5$ and $R^6$ having each exactly one hydroxyl group,
b. mixing polymer mixture A with
   (b1) an acid B1 which has at least one acid group and two further functional groups selected from the group consisting of hydroxyl groups, primary amino groups, and secondary amino groups,
c. reacting the mixture prepared in step b. with at least one polyfunctional isocyanate C having at least two isocyanate groups per molecule, wherein the amount of isocyanate C is chosen such that there is a ratio of the number of isocyanate groups in component C to the number of hydroxyl groups present in the mixture prepared in step b. of from 2:1 to 1.1:1, until at least 90% of the hydroxyl groups of the mixture prepared in step b. are consumed by reaction with the isocyanate component C,
d. adding to the reaction product of step c. at least one of
   a hydroxyamine D having at least one primary or secondary amino group, and at least one hydroxyl group,
   a polyhydric alcohol E having at least two hydroxyl groups per molecule, and
   a polyfunctional amine F having at least two amino groups, each of the amino groups being selected from primary and secondary amino groups,
e. dispersing the reaction product of step d. in water, wherein the amounts of the reactants A, A1, B1, B2, B3, C, D, E, and F are chosen such that the resultant polyurethane PU fulfills the conditions (aa), (bb), (cc) and (dd) as stated in claim 1.

10. The process of claim 6, wherein a polyhydric organic compound A' having at least three hydroxyl groups per molecule and a molar mass of not more than 500 g/mol is added in step (b).

11. The process of claim 10 wherein the polyhydric compound A' is selected from the group consisting of trimethylolethane, trimethylolpropane, trimethylolbutane, pentaerythritol, ditrimethylolethane, and dipentaerythritol.

12. The process of claim 9, wherein a polyhydric organic compound A' having at least three hydroxyl groups per molecule and a molar mass of not more than 500 g/mol is added in step (b).

13. The process of claim 12 wherein the polyhydric compound A' is selected from the group consisting of trimethylolethane, trimethylolpropane, trimethylolbutane, pentaerythritol, ditrimethylolethane, and dipentaerythritol.

14. An aqueously dispersible polyurethane which comprises building blocks derived from hydroxy-functional polymers $A_i$ by removal of a hydrogen atom from at least one hydroxyl group —OH of hydroxy-functional polymers $A_i$ having a number average molar mass of at least 400 g/mol, and, on average, more than one hydroxyl group per molecule, where i is at least two, and which comprises a mass fraction of from 2 to 20% of building blocks derived from acids B1 which have at least one hydroxyl group or at least one amino group and at least one acid group, by removal of a hydrogen atom from at least one hydroxyl group —OH or amino group >NH of the said acids B1, and which further comprises building blocks derived from isocyanates C of formula $Q(NCO)_j$ where Q is an at least divalent hydrocarbon radical having from four to forty carbon atoms, and where j is an integer of at least 2, and also, from isocyanurates, biurets, allophanates, and uretdiones derived from any of these isocyanates, wherein the isocyanates may be aliphatic, cycloaliphatic, aromatic, or aromatic-aliphatic, the building blocks having the structure —(CO—NH—)$_{j-i}$-Q-(N=C=O)$_i$, where the average of i over all molecules present in the aqueously dispersed polyurethane assumes a value of from 0 to j–0.001 and wherein hydroxyl-functional polymers $A_i$ comprises a mass fraction of at least 1%, and up to 60%, of a silicon-containing hydroxy functional polymer A1 of formula III

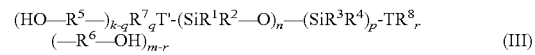

(III)

wherein
$R^1$ is selected from the group consisting of linear and branched alkyl groups having from one to ten carbon atoms, and aryl groups having from six to twenty carbon atoms, which aryl groups are unsubstituted or substituted by one or more groups selected from the group consisting of linear alkyl groups, branched alkyl groups, linear alkoxy groups, and branched alkoxy groups, each of these having from one to ten carbon atoms,
$R^2$ is selected from the same group as $R^1$, but independently thereof,
$R^3$ is selected from the same group as $R^1$, but independently thereof,
$R^4$ is selected from the same group as $R^1$, but independently thereof,
$R^5$ is selected from the group consisting of linear or branched alkylene groups having from one to ten carbon atoms, which alkylene groups are unsubstituted or substituted by one or more groups selected from the group consisting of linear alkyl groups, branched alkyl groups, linear alkoxy groups, and branched alkoxy groups, each of these having from one to ten carbon atoms,
$R^6$ is selected from the same group as $R^5$, but independently thereof,
$R^7$ is selected from the group consisting of a hydrogen atom, linear alkyl groups, branched alkyl groups, aryl groups, alkaryl groups, and aralkyl groups, wherein the alkyl groups have from one to twenty carbon atoms, and wherein the aryl groups, alkaryl groups, and aralkyl groups each have independently from each other from six to thirty carbon atoms,
$R^8$ is selected from the group consisting of a hydrogen atom, linear alkyl groups, branched alkyl groups, aryl groups, alkaryl groups, and aralkyl groups, wherein the alkyl groups have from one to twenty carbon atoms, and wherein the aryl groups, alkaryl groups, and aralkyl groups each have independently from each other from six to thirty carbon atoms,
T is a direct bond, or an atom selected from the group consisting of O and N, or an aliphatic or aromatic group with m+1 binding sites which are not on the same carbon atom, and m may be from 1 to 4, and is 1 for O, and 2 for N, r being an integer of from 0 to m−1, and T not being O if p is 0, T' is a direct bond or an atom selected from the group consisting of O and N, or an aliphatic or aromatic group with k+1 binding sites which are not on the same carbon atom in the case of T' being an aliphatic or aromatic group, and k may be from 1 to 4, and is 1 for O, and 2 for N, q being an integer of from 0 to k, n is on average 12, and p is 0 or 1, and wherein said silicon-containing polyol A1 is introduced into the polyurethane by reaction of said polyol A1 with said at least one polyfunctional isocyanate C having at least two isocyanate groups per molecule, said polyurethane having (aa) a specific amount of silicon $n(Si)/m(PU)$ of from 0.05 mol/kg to 1 mol/kg, (bb) a degree of branching measured as the sum of the specific amounts of substance of tertiary aliphatic carbon atoms $C^3$ and of quaternary aliphatic carbon atoms $C^4$, $(n(C^3)+n(C^4))/m(PU)$, of from 0.01 mol/kg to 0.5 mol/kg, which carbon atoms $C^3$ and $C^4$ are derived from trihydric or tetrahydric alcohols, (cc) a specific amount of urea groups, $n(U)/m(PU)$, wherein the urea groups are according to formula I, $$>N-CO-N< \quad \text{(formula I)}$$

of from 0.8 mol/kg to 2 mol/kg, and (dd) a specific amount of substance of hydroxyl groups, $n(-OH)/m(PU)$, of from 1 mol/kg to 4 mol/kg, wherein in each case the specific amount of substance is calculated as the ratio of the amount of substance n of the entity under consideration to the mass m(PU) of the polyurethane.

* * * * *